UNITED STATES PATENT OFFICE.

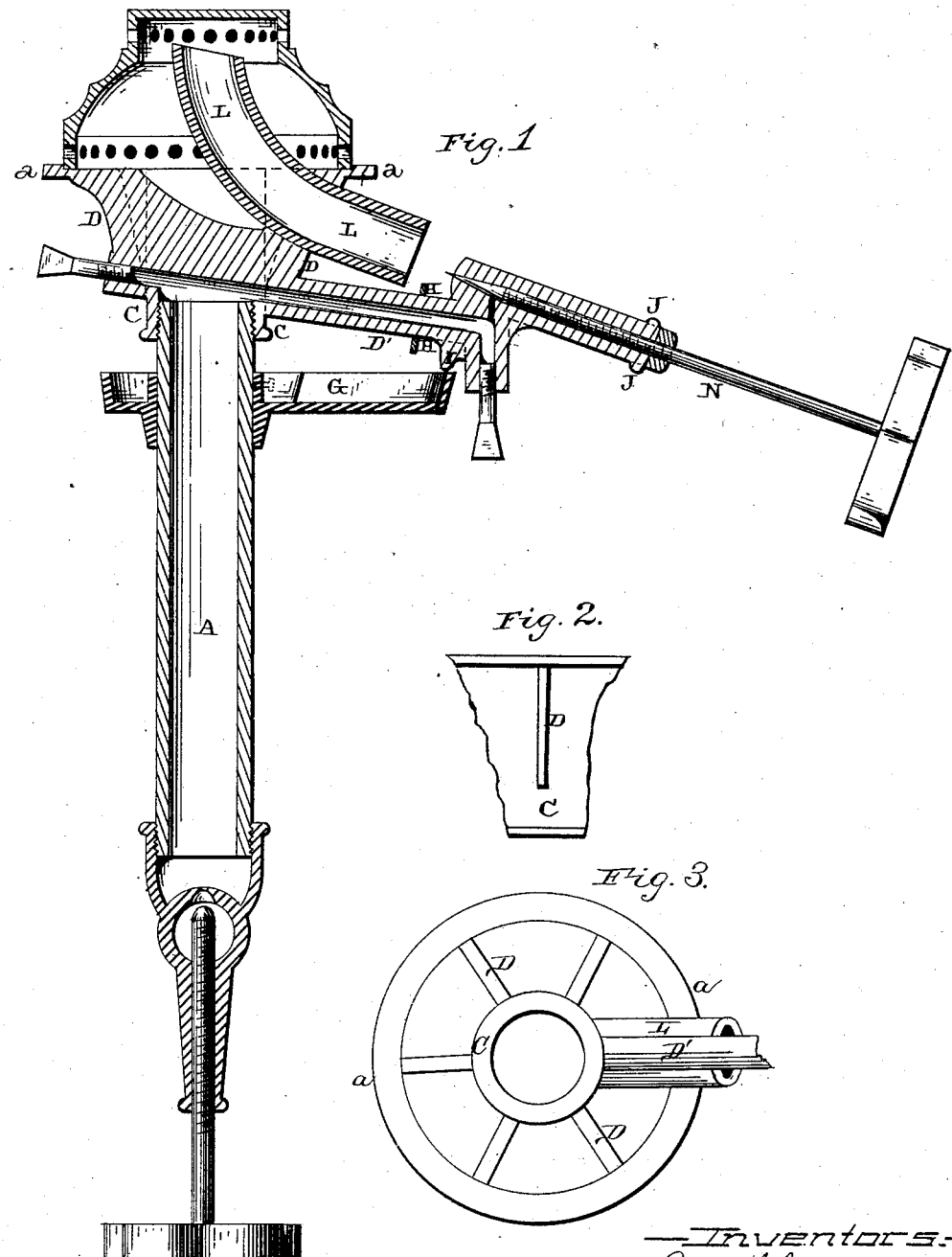

PAUL SCHNEIDER AND HENRY TRENKAMP, OF CLEVELAND, OHIO.

VAPOR-BURNER.

SPECIFICATION forming part of Letters Patent No. 318,303, dated May 19, 1885.

Application filed February 27, 1884. (No model.)

*To all whom it may concern:*

Be it known that we, PAUL SCHNEIDER and HENRY TRENKAMP, of Cleveland, in the county of Cuyahoga and State of Ohio, have invented certain new and useful Improvements in Vapor-Burners; and we do hereby declare the following to be a full, clear, and exact description of the invention, such as will enable others skilled in the art to which it pertains to make and use it, reference being had to the accompanying drawings, which form part of this specification.

Our invention relates to an improvement in vapor-burners; and it consists, first, in the combination of the stand-pipe, the burner applied directly to its top, the inclined pipe which projects from the side of the burner and supports the needle-valve and its barrel upon its outer end, the inclined needle-valve, and the inclined induction-tube, having its upper end curved and cut off at an angle; second, in the combination of the stand-pipe, the base or socket fitting directly upon the upper end thereof, and provided with heating-ribs, and a flat base, and the burner-cap; third, in a vapor-burner, an induction-tube having its upper end cut away, so as to be higher on one side than the other, all of which will be more fully described hereinafter.

The object of our invention is to produce a vapor-burner in which the burner proper is placed directly upon the top of the stand-pipe, so as to dispense with all intervening metal, and thus have the heat of vaporization applied directly to the upper end of the stand-pipe, instead of having it conducted through indirectly.

Figure 1 is a vertical section of a burner embodying our invention. Fig. 2 is a detail view showing one of the webs for conducting the heat. Fig. 3 is an inverted view of the burner, showing the heat-conducting ribs.

A represents the stand-pipe, upon the top of which is placed the burner proper, instead of having the burner placed slightly to one side and connected thereto, as is generally the case. The base $a$ of the burner is made flat, as shown, and between this base-plate and the socket C are made a number of webs, D, by which the heat to vaporize the fluid is conducted to the burner base or socket and the top of the stand-pipe. By means of this construction the parts can be made very light and cheap, and at the same time an abundance of vaporizing-heat is insured. The pipe D' projects from one side of the base or socket of the burner, and is inclined downward a suitable distance for the purpose of trapping the heavier portion of the fluid and holding it longer in contact with the heated portions of the pipe, and thereby effect a more complete vaporization than where they are allowed to escape directly from the burner.

The drip-cup G is made to encircle the top of the stand-pipe, as shown, and is secured in place by means of a set-screw, or any other way that may be preferred. When this cup is filled with fluid and the fluid lighted, the heat rises up directly around the burner, and thus heats both the stand-pipe and the burner at the same time.

In order to cause the fluid to run directly into the cup when the cup is being filled to start the burner, a rib, H, is made directly around the pipe, and this rib projects down into the cup in order to catch and conduct the vapor directly to the cup. Suitable webs, I, are also made at the outer end of the inclined pipe, with the other parts connected thereto, and these webs serve to direct the oil which drips from the needle-orifice into the lighting-cup. The oil clings to the webs from frictional contact, and will not drop off as long as there is metal to conduct it downward in any direction. The webs and rib serve to catch the oil and conduct it toward and into the cup. The lower portion of the flange I, being the lowest point, always serves as a drip-plate to collect and deliver the fluid into the cup, while the bead J prevents a backflow of the fluid down the needle and over the hand.

The induction-tube L is curved upward and forward of a straight line at its upper end, as shown, and the end is cut away at an angle, so as to prevent the greater portion of the inflowing vapor from being forced through the holes in the rear side of the chamber. The front side of the end of the pipe being farther away from the top of the chamber than the rear side, the gas escapes more freely from the low side, and thus counteracts the impetus given to the vapor toward the rear side of the burner. Where the induction-pipe extends straight up into the burner, there is a constant tendency of the vapor to escape most freely at the back side of the burner, and thus produce longer flames from the back than any other point. By throwing the end of the induction-tube forward and cutting it off at an angle a more even distribution of the vapor is effected, and a bluer and hotter flame, as well as a more perfect combustion, is produced. The needle N is placed at an angle, as shown, it being more convenient to operate when placed vertical, at the same time deliver the vapor-jet with more force into the burner-cone, and produces a stiffer and more forcible flame than if it were placed horizontally. Where the needle is placed horizontally, the flame produced is torchy, and not so effective for heating purposes.

By means of the construction here shown and described a very light, simple, and cheap burner is produced, and one from which a greater heat can be obtained than from burners made in the ordinary manner.

Having thus described our invention, we claim—

1. In a vapor-burner, the combination of the stand-pipe A, the burner applied directly to its top, the inclined pipe D', projecting directly from the side of the burner and supporting the needle-valve and its barrel upon its outer end, the inclined needle-valve N, and the inclined induction-tube L, having its upper end curved and cut off at an angle, so as to prevent the delivery of a greater amount of gas upon one side of the mixing-chamber than upon the other, substantially as shown.

2. The combination of the stand-pipe A, the base or socket fitting directly upon the upper end thereof, and provided with the heating-ribs D and the flat base $a$, and the perforated burner-cap supported by said base, substantially as described.

3. In a vapor-burner, an induction-tube, L, having its upper end cut away, as shown, so as to prevent a greater delivery of gas upon one side of the chamber than upon the other, substantially as specified.

In testimony whereof we affix our signatures in presence of two witnesses.

PAUL SCHNEIDER.
HENRY TRENKAMP.

Witnesses:
GEORGE H. SCHWAN,
C. W. COLLISTER.